(12) United States Patent
Miller

(10) Patent No.: US 6,442,530 B1
(45) Date of Patent: Aug. 27, 2002

(54) COMPUTER-BASED SYSTEM AND METHOD FOR MAPPING AND CONVEYING PRODUCT LOCATION

(75) Inventor: Steven D. Miller, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/197,336

(22) Filed: Nov. 19, 1998

(51) Int. Cl.[7] .............................................. G06F 17/60
(52) U.S. Cl. ............................. 705/16; 705/22; 705/26
(58) Field of Search .............................. 705/16, 26–28, 705/22–23; 709/26–27; G06F 17/60

(56) References Cited

FOREIGN PATENT DOCUMENTS

| EP | 1003119 A2 | * | 11/1999 | ........... G01C/21/00 |
|---|---|---|---|---|
| GB | 2223617 A | * | 4/1990 | ........... G09F/13/04 |
| JP | 2000163449 | * | 6/2000 | ........... G06F/17/60 |

OTHER PUBLICATIONS

Halliday, MicroStation earns high–end CAD laurels, InforWorld, v16n7, pp. 75–81, Feb. 14, 1994.*
Wal–Mart triples data warehouse, Information Week, Feb. 17, 1997.*
NCR and Object Solutions, Inc. announce alliance, PR Newswire, p819CLW007, Aug. 19, 1998.*
Battle, With more associations participating AAIW is bigger and better than ever, Aftermarket Business, p22, Oct. 1, 1997.*
New from Microsoft, Traffic World, p45, Nov. 25, 1996.*
Blast beverage loading software to be distributed world–wide by ROADSHOW International, PR Newswire, p530DCTH 020, May 30, 1996.*
Teres, Systematic product picking: order picking, like supermarket shopping, can be improved with a little planning, Catalog Age, v9 n11, p115(2), Nov. 1992.*
Rose, Direct marketing software guide, Direct Marketing, v52 n2, p53(23), Jun. 1989.*
1989 5th annual directory of software and services, Traffic Management, v28 n5 , p66(15), May 1989.*
Data Research Associates, Inc. "Library Automation", from http://www.dra.com/, 1995.*
"Progressive Insurance Online", and "About Progressive". and "Progressive's History" from Progressive Casualty Insurance Company http://www1.progressive.com/, 1995.*
Spitzer, 1997: Year of the GIS, Part 2 (Client–based geographic information systems), DBMS, v10, n1, p63(6), ISSN: 1041–5173, Jan. 1997.*
"Visio unveils easy–to–use desktop mapping product", Business Wire, Jun. 1997.*
"World Wireless communications complletes contract with Klever marketing", PR Newswire, May 1998.*
"Weighty problems are banished by scanning", Packaging Digest, v29, n3, p50(2), ISSN:0030–9117, Mar. 1992.*
Laband, "The durability of informational signals and the content of advertising", Journal of Advertising, v18, n1, p13(6), ISSN:0091–3367, Dec. 1989.*
Mixon, "Advertising as information: further evidence", Southern Economic Journal, v61, n4, p1213(6), ISSN: 0038–4038, Apr. 1995.*
MapQuest.com Corporate, Copyright, Terms and conditions, and Welcome to MapQuest.com!, from http://www.mapquest.com/, 1996.*

* cited by examiner

Primary Examiner—Cuong H. Nguyen
(74) Attorney, Agent, or Firm—Priest & Goldstein, PLLC (57) ABSTRACT

In a system for conveying product location information to a retail customer, a retail customer enters a request for the location of a selected retail item into a retail self-service terminal, which is connected to an in-store computer system having product location information stored thereon. Interfaces are provided between the computer system and the retail self-service terminal, the interfaces having access to database tables having stored therein additional product location information. The interfaces further include underlying way-finding logic for plotting a path between the retail self-service terminal and the retail item. The directions to the selected retail item are provided as an output at the retail-self service terminal. This output can take the form of text, audio, and graphical images.

7 Claims, 4 Drawing Sheets

COMPUTER-BASED SYSTEM AND METHOD FOR MAPPING AND CONVEYING PRODUCT LOCATION

BACKGROUND OF THE INVENTION

1. Field of the Invention

The present invention relates generally to improvements to computerized systems for providing information to retail customers, and more particularly to advantageous aspects of a system and methods for mapping and conveying product location information to retail customers.

2. Description of the Prior Art

Retail customers in a large retail establishment, e.g., a department store, often do not know precisely where within the store to find a desired item. In order to locate the item, the customer begins by attempting to guess in which department of the store the item is located. The customer then typically attempts to locate store personnel to ask directions or, alternatively, to locate a listing of departments, which is typically found proximate to an escalator bank in the middle of the store. Such a listing often takes the form of an alphabetical display board that simply lists the floor for each department. Even if a store map is available, the customer must find the map and then attempt to determine a path from his or her present location to the desired department.

It is apparent that the above systems for providing product location information to a retail customer suffer from numerous disadvantages. Directions are not easy to obtain if the department in which the item is located is not known, if store personnel cannot be located, or if the person found does not know a particular product's location. Further, the customer may have difficulties in reading available maps and/or signage. This would be the case, for example, where the customer suffers from visual impairment or has limited English-language ability.

There is thus a need for an easy-to-use, computerized system for providing product location information to retail customers.

SUMMARY OF THE INVENTION

The present invention provides a system for readily conveying product location information to a retail customer. In one embodiment of the invention, a retail customer centers a request for the location of a selected retail item into a retail self-service terminal, which is connected to an in-store computer system having product location information stored thereon. Interfaces are provided between the computer system and the retail self-service terminal, the interfaces having access to database tables having stored therein additional product location information. The interfaces further include underlying way-finding logic for plotting a path between the retail self-service terminal and the retail item. The directions to the selected retail item are provided as an output at the retail-self service terminal. This output can take the form of text, audio, and graphical images.

Additional features and advantages of the present invention will become apparent by reference to the following detailed description and accompanying drawings.

DETAILED DESCRIPTION

The present invention provides a system and methods for providing product location information to retail customers. The information may take the form of text, multimedia or audio clips, and/or graphical images, such as maps.

Figure 1:
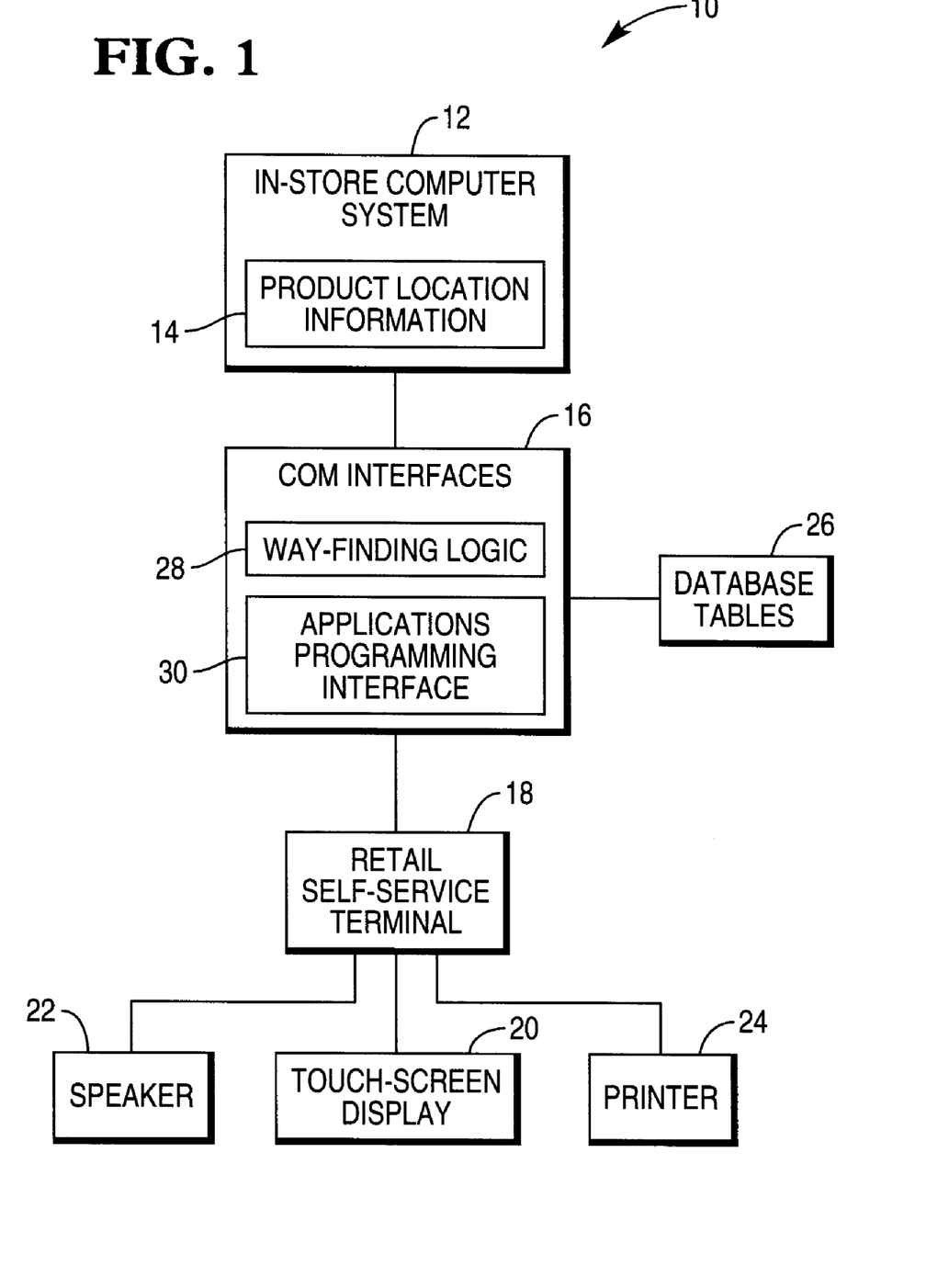
FIG. 1 shows a diagram of a product locator system according to the present invention.

FIG. 1 shows a block diagram of an embodiment of a product locator system 10 according to the present invention. This embodiment is designed to work in conjunction with a retail establishment's current in-store computer system 12 (also called the "legacy system"), which typically includes product location information 14, including department and aisle/shelf information. The present embodiment of the product locator system further includes COM interfaces 16 between the in-store computer system 12 and retail self-service information terminals 18 located throughout the store. Each retail self-service terminal 18 may suitably be a multi-purpose unit that provides information to retail customers as to product location, and also as to other topics of interest to shoppers, including pricing information and sales promotions. The retail customer enters an information request at a retail self-service terminal through the use of a touch-screen display 20 or other input device, such as a keyboard. Each self-service terminal further preferably includes various output devices, including a speaker 22 and printer 24.

The COM interfaces 16 provide access to product location information stored in database tables 26, as well as to product location information 14 stored in the in-store computer 12, for any item in a retail store. The information may take the form of text, multimedia or audio clips, and/or graphical images, such as maps. In the presently preferred embodiment, it is expected that any non-textual information will exist in static form. The COM interfaces 16 also support database fields that can be used to assemble map information through real-time Java applets or that can be used to create store map HTML pages or imagemaps. The COM interfaces 16 further incorporate path-finding methods, performed by way-finding logic 28, that allow a path from each retail terminal 18 to the ultimate destination to be defined through a series of intermediate points. The embodiment uses X/Y coordinate values on an underlying map, which is designed to be compatible with Geographic Information Systems (GIS).

In response to a customer request for information that is provided as an input at one of the retail terminals 18 using touch-screen display 20, data is extracted from the product location information 14 stored in the in-store computer system 12 to give minimal product location information (e.g., a department or aisle/shelf number). Through the use of data extraction and minimal configuration, the product locator system 10 produces readable location information at the retail terminal at which the request for information has been made, e.g.:

PILLSBURY BROWNIE MIX 24 OZ. CAN BE FOUND IN THE FOLLOWING LOCATIONS:
AISLE 3, TOP SHELF

The system can be configured to allow the association of audio clips and graphical images with the "bare-bones" text. Graphical images can be maps with paths traced on them, but they can also be pictures of pertinent features ("landmarks") along the way to the destination. By combining audio clips and images, directions can be given that mimic what one person says and shows to another. The product locator system is designed to allow location information to be conveyed to the user in whatever way(s) make sense.

In the present embodiment of the product locator system, the system database tables 26 are stored in a format that is compatible with Geographic Information Systems ("GIS"). Thus, the product locator system can be used to show directions from one store to another. In such an embodiment, store location can be stored as HTML pages.

The product locator system is designed to allow a Web-browser-based terminal to convey information, in the form of text, audio clips, and/or graphical images, as to the location of a selected product within a stored and/or the path from the terminal to this location. A range of destination locations is intended, from an overall department to a specific aisle to a specific position on a specific shelf. Whatever location information is available in the current store system (usually only a department or aisle number or at most an electronic price label location string) is intended to be used as the basis of the product locator module.

The present embodiment of the product locator system is designed to integrate with third-party application packages, including planogramming and GIS products. Planogramming databases often provide shelf position information for specific item codes, with the shelf s location in the store possibly defined as well. GIS databases, although usually applied to allow way-finding on geographic maps, could be scaled down to define a store layout as the underlying map on which paths are traced. The present product locator system is compatible with both types of applications. Of course, tight integration can occur only if a third-party package provides all the required location information. In that case, the present product locator system can provide the missing pieces of location information for looser integration.

The product locator system provides COM interfaces that return information of the type needed to populate HTML pages with appropriate content. Location information is not typically subject to minute-by-minute change. Consequently, location information need not be obtained directly from the base store system 12 upon each access. If desired, however, the product locator system can be customized to include this feature. In most cases, access to the current store system will be used to obtain a general piece of location information, such as the department or location string associated with an item code.

During store set-up and at any later time, such as during store reorganization, the product location system runs a batch operation to extract general location information available on the current store system. This general location information is extracted into database tables 26 used by the product locator system to provide location information. These tables can be augmented by additional information (e.g., audio clips and store maps) that are not normally available in point-of-service (POS) or in-store processor (ISP) systems, but that can be provided in a relatively straightforward manner. Duplicate information contained in the product locator system database tables and in the current store system will generally consist only of a look-up number (such as a department number) and in some cases a description (such as a department description in a single language).

The COM objects allow access to information in a variety of forms, to pave the way for a wide range of location-based applications. At one end of the spectrum, full information provided by an external location package can be passed back that can take the form of a multimedia clip showing the full path to the selected location. In addition, the product location system can provide support for Java applets that, when provided with a base map and coordinate information, can trace paths from the source location (i.e., the retail information terminal) to the destination location and/or highlight the source and destination locations. In the present embodiment, however, the returned information consists of text, a single multimedia or audio clip, and/or a static map image.

The product locator system is designed to guide a retail customer to the location of a selected individual product. However, the system provides additional database information that also supports higher-level applications, such as department locators. The COM interfaces support these higher-level location applications, although pure database access may provide equally valuable information. The database tables 26 are discussed in greater detail below.

Underlying the COM components is way-finding logic 28 that builds a path from the specified source location (e.g., a retail information terminal) to the specified destination location (usually an aisle or department containing the requested item). The path is allowed to span multiple maps/images, so that a store map from the retail information terminal's perspective can give way to a department layout map, which in turn can give way to a shelf planogram or photo. Text and audio clips can accompany each point along the path.

Location points, expressed as IDs that point to map coordinates, need to be defined at least for each ultimate destination. To allow for customized directions from a given starting point, the location points of all retail information terminals in the store also need to be defined. Intermediate points can also be defined, if desired. In such a case, careful planning and maintenance is required if the intermediate points are to be associated with text or audio clips that provide directions for a portion of an overall path. Intermediate points may prove most useful to trace non-direct paths on a base map. In any case, the underlying logic determines a path and the points on the path given any two distinct locations.

Since the retail information terminals may be oriented in different directions on a store floor, the same base map may need to be presented from different perspectives on different devices. The product locator system databases allow definition of rotation as counterclockwise angles of rotation of the base map and also as static copies of the map that have been rotated properly beforehand, which may be needed to display rotation without integration of third-party software. The product locator system at a minimum should support two-dimensional rotation angles of 0, 90, 180, and 270 for rectangular images. If desired, three-dimensional rotation can be implemented as well. Other two-dimensional rotation angles are supported for square images. Rotation angle calculations are needed to allow the calculation of X/Y coordinates on rotated maps to be calculated from base map X/Y coordinates.

In the present embodiment of the product locator system, an applications programming interface (API) 30 is used to log events. The system also uses common data collection facilities.

Most of the database tables 26 supporting the product locator system are targeted explicitly towards the product locator system. However, certain database tables, e.g., terminal and item description information, can be used to support other systems. If appropriate, access to this common data is carried out through facilities provided by the other systems.

In the present embodiment of the system, interactions with the retail customer end-user are carried out by using data provided by the system or its underlying databases to create HTML pages and/or control Java applets that provide the user interface.

Specifically, much of the database location information can be displayed to the user through HTML using imagemaps. Imagemaps associate portions of a graphic with specific links. In this way, more detailed information about a specific department can be obtained simply by touching that department on a store map appearing on the display screen of the retail information terminal. Drill-down to actual planogram pictures of a shelf's contents can be implemented through multiple levels of imagemap links. Using imagemaps at the store-wide level might be implemented more easily in HTML through direct database look-up than through use of the COM interfaces, which are targeted for single-item look-up.

Imagemaps can be implemented through either server-side or client-side functionality. In the present embodiment of the invention, it has been found that server-side imagemaps can be implemented with the least amount of coding. To use imagemaps, two files are required: the map image itself and a corresponding map file that defines rectangular, polygonal, or circular shapes on the map as sets of point values and correlates these shapes to URLs. Each imagemap click causes server processing to occur, however, followed by an entirely new browser page being displayed.

Client-side functionality for imagemaps can be supported through the use of the ImageMap class approach to linking provided by Java. In this case, links are defined in the same HTML page as the picture itself, facilitating correlation of information. Java also allows animation, highlighting, and pop-ups when a specific portion of the picture is "in focus." This is most usefull when the cursor position and double-clicking are available as distinct concepts, which they may not be on touchscreens. However, Java can provide path-drawing capabilities that are beyond the scope of pure server-side imagemaps.

The COM interfaces 16 provided by the present invention return information sufficient to allow a Java applet to draw appropriate highlights or paths on a base map. Full support is also available for two-dimensional rotation of images in Java using the data returned from the COM objects.

Figure 2:
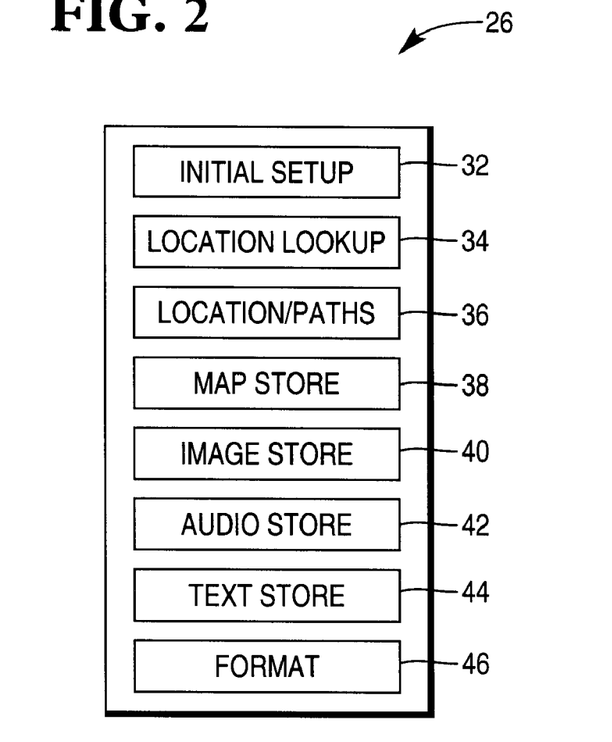
FIG. 2 shows a diagram of categories of database tables for use in the product locator system shown in FIG. 1.

As shown in FIG. 2, in the present embodiment of the invention, the database tables 26 include eight categories of database tables to support the product locator system:

(1) Initial Setup Database Tables

The Initial Setup database tables 32 define available selections for customizing operation for the device and the user of the device:

The STORE-OPTIONS table defines a store-default-language-id value for use in looking up language-dependent values;

The DEVICE table correlates an external key device-id to internal key values device-group-id, location-id, and orientation-id used in other database tables. The device from which the application is invoked flavors the information provided to the customer.

The DEVICE-GROUP table, keyed by the device-group-id value, describes default features of a group of related terminals, in particular a device-default-language-id value. This language value takes precedence over the system default language, but is superseded by consumer selection of a different language.

The LANGUAGE table contains a language-id value that corresponds to the DEVICE-GROUP table's device-default-language-id value and the STORE-OPTIONS table's store-default-language-id value. The product locator system accesses only the language-id field from this table. The language-id setting affects lookups into the LOCATION-IMAGE-CONTENT, LOCATION-AUDIO-CONTENT, and LOCATION-TEXT-CONTENT tables, discussed below.

The LOCATION-PREFERENCE table defines location-preference-id values that should not be used to determine a path when a specific preference is in effect. This can prevent stairs, for instance, from being displayed as a way between floors to a consumer choosing to see wheelchair-accessible routes.

(2) Location Lookup Database Tables

The Location Lookup database tables 34 allow determination of an item's location in the store:

The ITEM-LOCATION table correlates an external key item-id to an internal key location-id used in the LOCATION, LOCATION-PATH, INVALID-LOCATION, and LOCATION-BORDER-POINT tables. Data in this table is needed only if location information exists for individual price look-up items, but cannot be determined programmatically or though a third-party application.

The ITEM table correlates an external key item-id to an internal key department-id that can be used for examination of the DEPARTMENT table. Department location information is the default when the location of individual items is not tracked. Data in this table is needed if location information cannot be extracted programmatically from the item-id value. The item-id value may be made up of a number of discrete fields, one of which is likely to be a department-id value.

The DEPARTMENT table allows iterative look-up through a hierarchy of department-id and parent-department-id values. Any one of these IDs may correspond to an entry in the DEPARTMENT-LOCATION table. The first matching DEPARTMENT-LOCATION table entry is used for processing, since location information associated with a small sub-department is more likely to be useful than location information associated with its overall department.

The DEPARTMENT-LOCATION table correlates a department identifier department-id to an internal location-id key. The department-id value may have been extracted from the item-id value, looked up from the ITEM and DEPARTMENT tables, or returned from a third-party application.

(3) Locations/Paths Tables

The Location/Paths database tables 36 define text, multimedia/audio, and/or graphical image ID's that are used to describe a location or the path between two defined locations:

The LOCATION table correlates a location-id value to an underlying map location-map-id, on which it graphs a point location-x-coordinate, location-y-coordinate, and location-z-coordinate, and associates the location-id with text location-text-id, multimedia audio location-audio-id, and a static graphical indication of the location location-image-id. In the present embodiment, the coordinate values serve a double purpose: defining a point for way-finding purposes and making the center of the location-image-id image on the underlying map. In an alternative embodiment, the location-image-type field associated with the location-image-id field can be used to refer to a base map overlay that is "permanent" on the map (e.g., a "You Are Here" overlay) or "temporary" (disappearing when the next overlay comes into play on the same map).

The LOCATION-PATH table defines textual (location-text-id), multimedia/audio (location-audio-id), and graphical information (location-image-id, location-path-x-coordinate, location-path-y-coordinate, location-path-z-coordinate) that describes a path between two locations (location-path-source-id and location-path-destination-id). Each of the two locations represented in the path segment correspond to a location-id value in the LOCATION table. Although, in the present embodiment, the location-path-image-type field associated with the location-image-id field is not used, in an alternative embodiment, it is anticipated that it could be used to refer to a base map overlay that is "permanent" on the map (i.e., maintained even when the next overlay appears) or "temporary" (disappearing when the next overlay comes into play on the same map).

The LOCATION-BORDER-POINT table defines a number of coordinate values (location-border-x-coordinate, location-border-y-coordinate, location-border-z-coordinate) that trace a polygonal boundary around a location (location-id) on the base map. A location-border-point-sequence-number is defined as part of the table's key, so that the individual points can be accessed in sequence. Any non-rectangular border should be defined explicitly, either in this table or through a map overlay in the LOCATION table entry for the associated location-id value. The LOCATION-BORDER-POINT data will prove most useful for defining imagemap hot spots or Javacreated border highlights. Data in the table is intended for use in the present embodiment only if back office facilities are provided to configure it.

(4) Map Store Database Tables

The Map Store database tables 38 define all base maps used by product locator system and the relationships between the maps, to support way-finding algorithms between points on one or more maps:

The ORIENTED-LOCATION-MAP table defines all base maps for use with the present product locator system. The table is keyed by location-map-id and orientation-id values that correspond to a static map image (location-image-id) and to counterclockwise angles of rotation (location-image-rotation-2d, location-image-rotation-3d). A static image definition (location-image-id) must exist for an orientation-id value of zero. The location-image-id value may be null (i.e., zero) if rotation of the base image occurs programmatically, which is not supported in the present embodiment. The rotation angles need to be supplied appropriately even if static images are defined for each possible orientation, since the rotation information is needed to convert coordinates plotted on the non-rotated base map to coordinates on any rotated map. In the present embodiment, rectangular images may be rotated by multiples of 90 degrees. Square images may be rotated by any number of degrees.

The LOCATION-MAP-TRANSITION table defines locations where one base map can give way to another, such as the first-floor map to the second-floor map or a department layout map to a shelf planogram. The table simply correlates one point (location-path-source-id) on one map (source-map-id) to another point (location-path-destination-id) on another map (destination-map-id). The points correspond to entries in the LOCATION table, while the maps correspond to entries in the ORIENTED-LOCATION-MAP table.

The LOCATION-MAP-LABEL table defines locations on the underlying map/image (location-map-id) oriented as necessary (orientation-id). A location-map-label-id field allows definition of the distinct labels associated with the map. Each label is described in terms of an image (location-image-id), the coordinates of the image on the base map (location-map-label-x-coordinate, location-map-label-y-coordinate, location-map-label-z-coordinate), and the counterclockwise angle of rotation to apply the label (location-image-rotation-2d, location-image-rotation-3d), which may be distinct from the rotation applied to the underlying map. Data in the table is intended for use in the present embodiment only if back office facilities are provided to configure it.

(5) Image Store Database Table

The Image Store database table 40 defines all graphical images used by the product locator system:

The LOCATION-IMAGE-CONTENT table defines all static maps and graphical images, identified by ID (location-image-id), counterclockwise angle of rotation (location-image-rotation-2d, location-image-rotation-3d), and specified language-id and location-preference-id values. Image information consists of a URL (location-image-url) and its size (location-image-x-extent, location-image-y-extent, location-image-z-extent). In the present embodiment, non-zero angles of rotation are not expected for any images. A location-image-scale-factor field is defined to allow translation of extent and coordinate information from one scale to another (e.g., inches to pixels), although this field is not used in the present embodiment.

(6) Audio Store Database Table

The Audio Store database table 42 defines all multimedia/audio clips used by the product locator system:

The LOCATION-AUDIO-CONTENT table defines all multimedia and audio clips in terms of an ID (location-audio-id) and specified language-id and location-preference-id values. It correlates these key values with a URL (location-audio-url).

(7) Text Store Database Table

The Text Store database table 44 defines all text associated with the product locator system:

The LOCATION-TEXT-CONTENT table defines all descriptive text associated with the product locator system, identified by an ID (location-text-id) and specific language-id and location-preference-id values. It correlates these key values with a text string (location-text).

(8) Format Table Entries

In addition to the categories of tables listed above, format table entries 46 are needed to allow table information to be formatted into readable text strings. These format table entries provide little benefit if LOCATION-PATH table text IDs point to self-contained descriptions. They allow other sorts of information to substitute for LOCATION-PATH text, however, when data extraction from an existing legacy system is all that is required.

Figure 3:
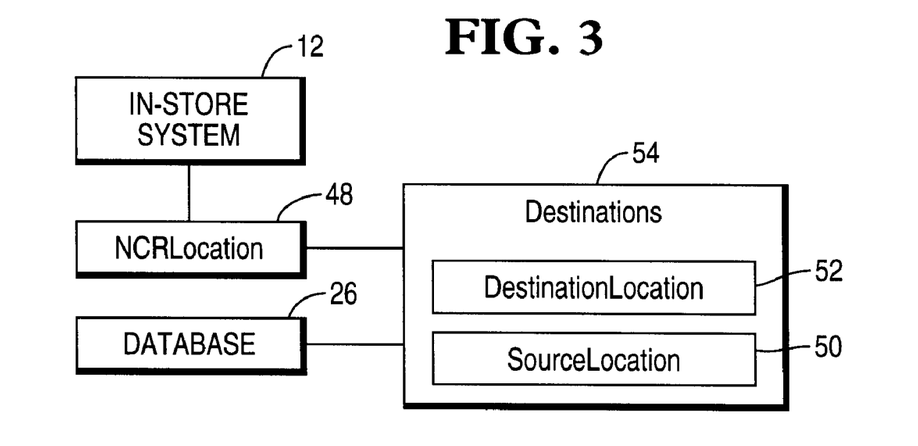
FIG. 3 shows the relationships among externally exposed COM interfaces and the overall system in a presently preferred embodiment of the invention.

FIG. 3 shows the relationships among the externally exposed COM interfaces and the overall system. Four COM interfaces are exposed for direct use by the end-user in conjunction with the product location system: NCRLocation 48, SourceLocation 50, DestinationLocation 52, and Destinations 54. The NCRLocation COM interface 48 supplies customized code to interact with an independent system at the store to retrieve location-related information. The SourceLocation COM interface 50 defines a retail self-service location and user preferences. The DestinationLocation COM interface 52 defines a department or product location and the path from the SourceLocation object. The Destinations COM interface 54 defines one or more product locations as DestinationLocation objects associated with a single SourceLocation object.

The NCR Location COM object allows interaction with the in-store system to obtain location information, such as extracting a department number from a Price Look-Up (PLU) number that contains Stock-Keeping Unit (SKU), class, and department portions or looking up a PLU number's location in planogramming tables. Database 26 supplies all other location information.

The SourceLocation object can stand alone to describe the location of a retail self-service terminal, such as for a "you are here" map. A DestinationLocation object exists in conjunction with a SourceLocation Object, so that a path can be devised from the retail self-service terminal to the destination location. For PLU items with multiple locations within a store, such as in an aisle and also in an end-cap display, the Destinations object can include multiple DestinationLocation objects.

Figure 4:
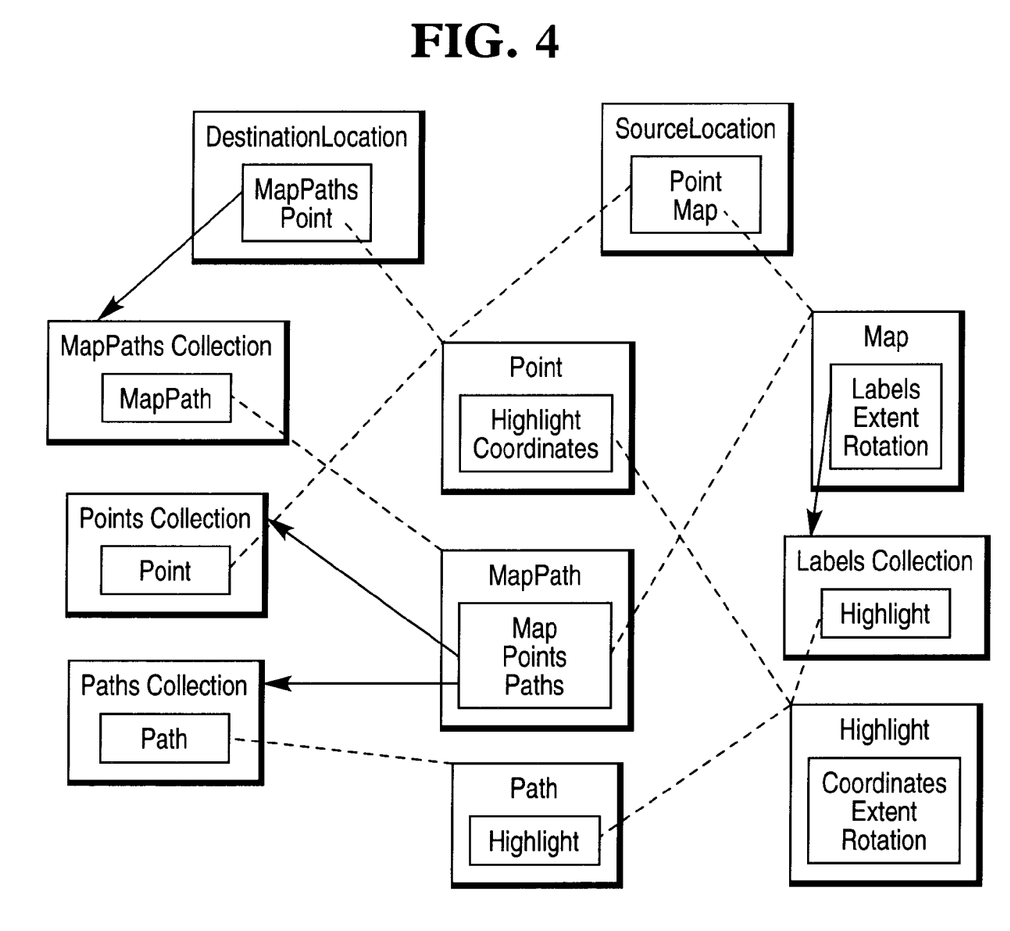
FIG. 4 shows the relationships among the internal and externally exposed COM interfaces in the FIG. 3 embodiment of the invention.

Additional COM objects are supplied that are pointed to by the externally exposed COM interfaces. These additional COM objects contain properties that allow access to detailed location information. FIG. 4 shows the relationships among the internal and externally exposed COM interfaces:

DestinationLocations defines one or more DestinationLocation objects, each associated with a distinct destination location. Multiple destination locations can exist only when a PLU item is specified as the destination. This is a collection object with standard ATL COM collection functionality.

MapPaths defines one or more MapPath objects, each associated with a distinct base map. This is a collection object with standard ATL COM collection functionality.

MapPath defines a set of Map, Points, and Paths objects associated with a single base map. The path from source location to destination location may be made up of path segments on more than one base map.

Map defines a base static image and associated Labels, Extent, and Rotation objects.

Points defines one or more Point objects associated with a single Map object. This is a collection object with standard ATL COM collection functionality.

Point defines multimedia/audio and text information associated with a single point on a map, along with Highlight and Coordinates objects.

Paths defines a Path object for each path segment associated with a single Map object. This is a collection object with standard ATL collection functionality.

Path defines multimedia/audio, point list, and text information associated with a single path segment on a map, along with a Highlight object.

Labels defines one or more Highlight objects associated with labels on a single map. This is a collection object with standard ATL COM collection functionality.

Highlight defines one map label or highlight, primarily through associated Coordinates, Extent, and Rotation objects.

Extent defines X/Y/Z pixel sizes for an image.

Coordinates defines a single X/Y/Z coordinate on a base map as the point on which to "pin" a highlight or as a location to support path-finding.

Rotation defines a counterclockwise rotation angle in two and three dimensions.

In the present embodiment, all COM objects supplied are implemented using Visual C++ and the ATL Wizard. The objects are created as "Simple COM Objects" using ATL. This method of implementation supports the standard COM dual (IDispatch) interface.

The programmatic IDs associated with each COM object consist of the string "RSSAS," a dot, and the name of the object, such as "RSSAS.Points" or "RSSAS.SourceLocation."

Figure 5:
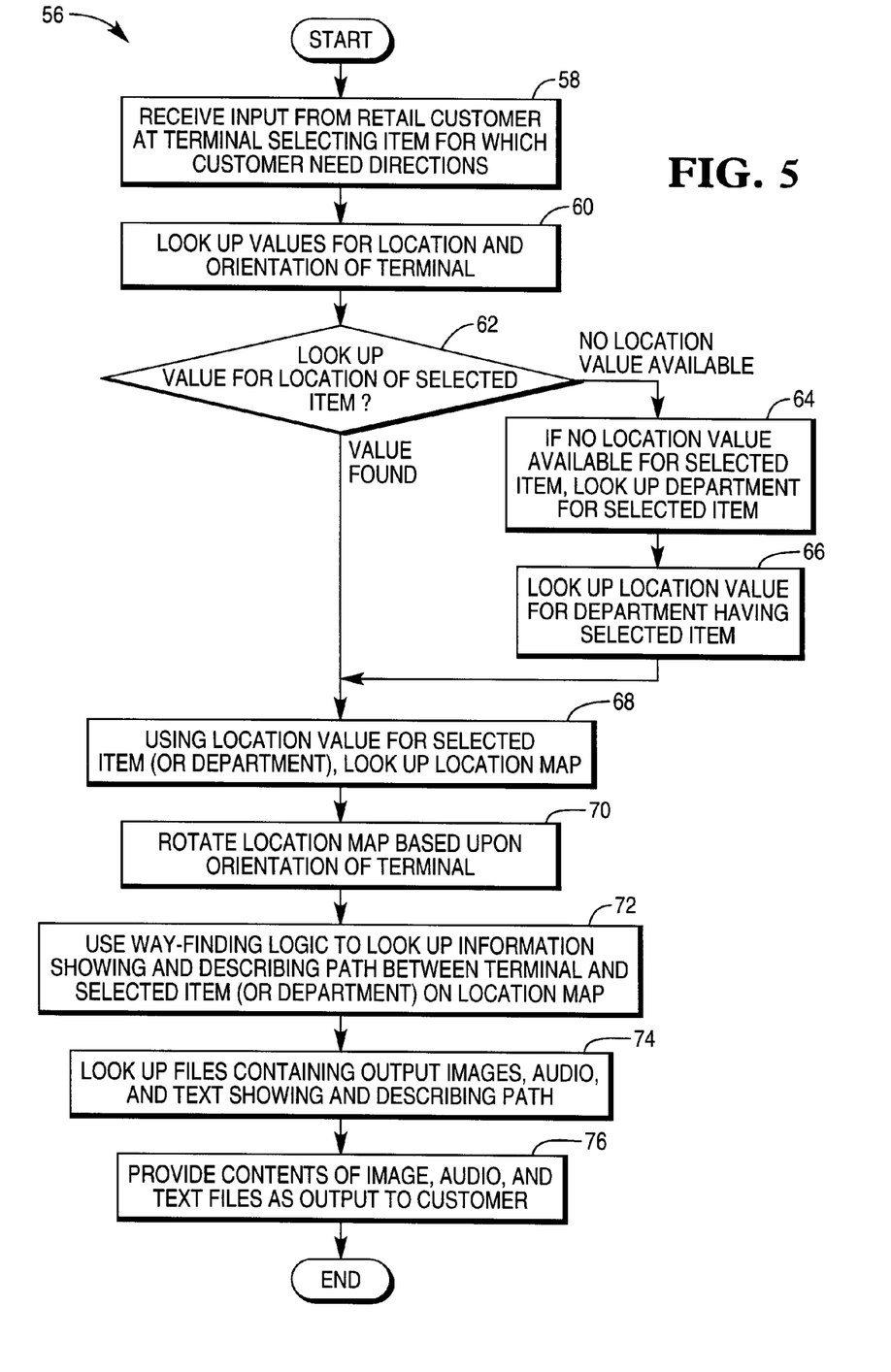
FIG. 5 shows a diagram of a method for mapping and conveying product information according to the present invention.

FIG. 5 shows a flowchart of a method 56 according to the present invention. The method begins in step 58 with the retail customer providing an input at the retail self-service terminal. As discussed above, in the present embodiment of the invention, the terminal includes a touch-screen display for this purpose, although it would also be within the spirit of the present invention to provide a keyboard or other input device. The input at the touch-screen display includes, of course, the retail item being sought, but may also include the language in which the customer would like to receive directions to the selected item, or other inputs.

In step 60, in response to the customer input of a selected item, the system determines the location and orientation of the terminal at which the request is being made. This is accomplished by using the device-id key assigned to the terminal to obtain location-id and orientation-id values for the terminal. In step 62, the system determines the location of the selected retail item by using the item-id key to obtain the location-id value for the item. If there is no location-id for the item, i.e., if the system returns a null value, then in step 64 the system looks up the department having the selected item by using the item-id key to obtain a department-id. This can be done programmatically. In step 66, the system looks up the location value for the department having the selected item by using the department-id key and iterative calls, if necessary, to obtain a non-null location-id from the DEPARTMENT-LOCATION table.

In step 68, the system looks up the appropriate map for the item (or department) by using the location-id value retrieved from the ITEM-LOCATION or DEPARTMENT-LOCATION table to look up a location-map-id value. In step 70, the system rotates the map to the proper orientation relative to the terminal by using the location-map-id value retrieved from the LOCATION table and the orientation-id value retrieved from the DEVICE table to look up location-image-rotation-2d and location-image-rotation-3d values for images on the base map. In step 72, the system then uses its way-finding logic to look up information showing and describing the path between the terminal and the selected item. In this step, the system uses the location-id values retrieved from the DEVICE and ITEM-LOCATION/DEPARTMENT-LOCATION tables to retrieve location-image-id, location-audio-id, and location-text-id values.

In step 74, this information is used to look up files containing output images, audio, and text showing and describing the path to the selected item. In particular, the system uses the image-id key from the LOCATION-PATH table and the location-image-rotation-2d and the location-image-rotation-3d values from the ORIENTED-LOCATION-MAP table to obtain a location-image-url file name that contains a picture of the path from the retail self-service terminal to the item's location, with appropriate rotation. Also, the system uses the location-audio-id key from the LOCATION-PATH table to obtain a location-audio-url file name that describes the path from the retail self-service terminal to the item's location, and the system uses the location-text-id key from the LOCATION-PATH table to obtain text describing the path from the retail self-service terminal to the item's location. Finally, once the proper output files have been identified, the contents of the files are provided in step 76 as an output to the retail customer at the retail self-service terminal.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A product location system, comprising:

an in-store computer system in which product location information is stored;

a Location COM interface for providing customized code to interact with the in-store computer system to retrieve product location information; and a Destinations COM interface for defining a product location as a DestinationLocation object associated with a SourceLocation object, the Destinations COM interface including:

a SourceLocation COM interface for defining, in a SourceLocation object, the location of a retail self-service terminal connected to the in-store computer system, the SourceLocation object including a definition of a point at which the retail self-service terminal is located and a map of the location of the retail self-service terminal, and a DestinationLocation COM interface for defining, in a DestinationLocation object, the location of a product, the DestinationLocation object including a definition of a point at which the product is located and a MapPaths object including a definition of a path between the retail self-service terminal and the product to be located.

2. The system of claim 1, further comprising:

a database accessible by the Destinations COM interface for providing additional product location information to the Destinations COM interface.

3. The system of claim 1, wherein the Location COM interface interacts with the in-store computer system to obtain product location information by extracting a department number from a PLU number.

4. The system of claim 3, wherein the PLU number contains SKU, class, and department portions.

5. The system of claim 1, wherein the Location COM interface interacts with the in-store computer system to obtain product location information by looking up a PLU number's location in planogramming tables.

6. The system of claim 1, wherein the Destinations COM interface defines multiple DestinationLocation objects for products with multiple locations.

7. The system of claim 1, further comprising the following COM interfaces accessible by the Destinations COM interface:

a Map COM interface for defining, in a Map object, a base static image;

a Point COM interface for defining, in a Point object, multimedia/audio and text information associated with a single point on a map;

a Points COM interface for defining Point objects associated with a single Map object;

a Path COM interface for defining, in a Path object, multimedia/audio, a list of points, and text information associated with a single path segment on a map;

a Paths COM interface for defining a Path object for each path segment associated with a single Map object;

a MapPath COM interface for defining, in a MapPath object, a set of Map, Points, and Paths objects associated with a single base Map; and a MapPaths COM interface for defining one or more MapPath objects, each associated with a distinct base map.

* * * * *